United States Patent
Bever

(12) 
(10) Patent No.: US 7,255,360 B2
(45) Date of Patent: Aug. 14, 2007

(54) RIDER SUPPORT ASSEMBLY FOR MULTI-WHEELED VEHICLE

(76) Inventor: Patrick T. Bever, 3447 Forbes Ave., Santa Clara, CA (US) 95051

( * ) Notice: Subject to any disclaimer, the term of this patent is extended or adjusted under 35 U.S.C. 154(b) by 86 days.

(21) Appl. No.: 11/038,293

(22) Filed: Jan. 18, 2005

(65) Prior Publication Data

US 2006/0157957 A1 Jul. 20, 2006

(51) Int. Cl.
*B62J 1/28* (2006.01)
(52) U.S. Cl. .................... 280/290; 280/404; 128/78
(58) Field of Classification Search ............ 280/404.4, 280/290; 128/78
See application file for complete search history.

(56) References Cited

U.S. PATENT DOCUMENTS 4,981,306 A * 1/1991 Young ...................... 280/290

2006/0049611 A1 * 3/2006 Stevens ................... 280/288.4

* cited by examiner

*Primary Examiner*—Lesley D. Morris
*Assistant Examiner*—Marlon Arce-Diaz
(74) *Attorney, Agent, or Firm*—Bever, Hoffman & Harms, LLP; Patrick T. Bever

(57) ABSTRACT

A rider support assembly for a bicycle, motorcycle or other multi-wheeled vehicle that utilizes a harness to suspend the rider from a support frame that is attached to a ball-type mounting structure. The support harness includes straps or a sling that is secured to the rider's torso and/or legs. A base section of the support frame includes a connecting structure (e.g., a socket) that is movably connects to and supported by the mounting structure such that the support frame can be pivoted in any direction by the rider during operation. A flexible spine extends upward along the rider's back and is secured to the rider's upper body by the support harness. An optional mounting structure pivots relative to the vehicle to facilitate a relatively stiff spine that supports the rider when sitting upright or leaning back.

15 Claims, 5 Drawing Sheets

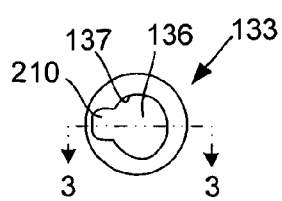
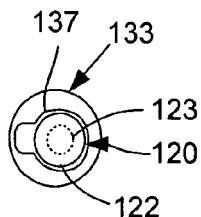
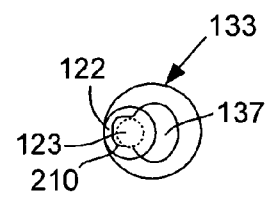
FIG. 2(A)   FIG. 2(B)   FIG. 2(C)
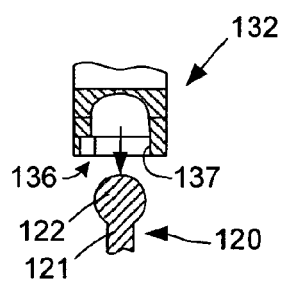
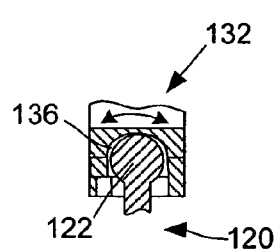
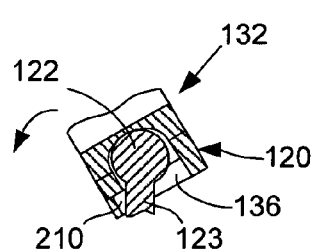
FIG. 3(A)   FIG. 3(B)   FIG. 3(C)
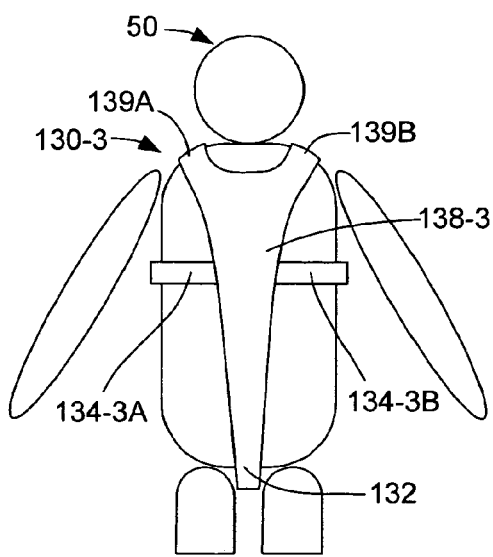
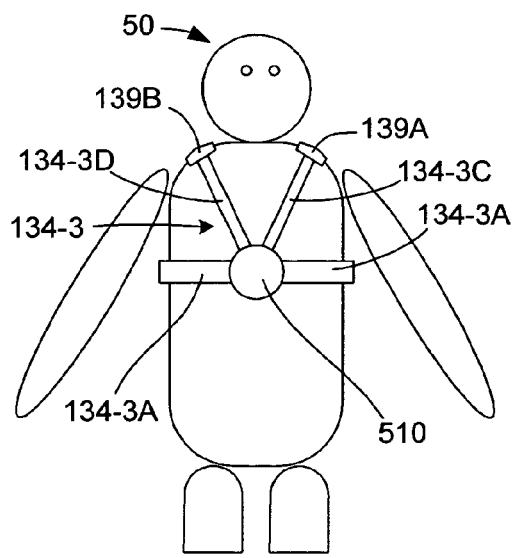
FIG. 5(A)   FIG. 5(B)

RIDER SUPPORT ASSEMBLY FOR MULTI-WHEELED VEHICLE

FIELD OF THE INVENTION

This invention relates to assemblies for supporting the operators (riders) of multi-wheeled vehicles (cycles), and more particularly to a support assembly including a suspension harness for supporting a cycle rider, and to a including such a suspension harness.

BACKGROUND OF THE INVENTION

Two-wheeled vehicles (e.g., bicycles and motorcycles; collectively referred to herein as cycles) have always utilized a seat for the rider to sit on during operation. Typical seats include a relatively narrow front portion (horn) and a relatively wide rear section. Such seats are straddled and sat upon by a rider such that the wider rear section supports the rider's buttocks, and the horn extends between the rider's legs under his/her crotch.

One problem associated with traditional cycle seats is the discomfort caused by pressure applied by the seat's horn on the rider's crotch. Depending on the orientation of the rider, the amount of pressure applied to the rider's crotch region can become significant, causing discomfort and, in extreme cases for male riders, can result in testicular damage and sterility.

Another comfort related problem associated with conventional cycle seating arrangements is that, in cases where the rider is expected to maintain a forward-leaning posture, pressure on the rider's lower back can cause significant pain and discomfort.

Yet another problem associated with bicycles having traditional straddled bicycle seats is that the maximum pressing force that can be applied to the pedals is limited to the rider's weight. That is, when pressing downward on a bicycle's pedal, the maximum pressing force a rider is able to apply to the pedal is generated by standing on the pedal.

What is needed is a seating-like rider support for two-wheeled vehicles that overcomes the problems associated with traditional cycle seats.

SUMMARY OF THE INVENTION

The present invention is directed to a rider support assembly for a multi-wheeled vehicle (e.g., a bicycle) in which the rider's weight is suspended by a harness from a support frame that is located behind the rider and is detachably connected to an associated mounting structure provided in the traditional seating area of the vehicle. In particular, the support assembly includes a support frame having a base section, a connection structure (e.g., a downward facing socket) located in the base section, and a suspension harness that is secured to the rider's legs and/or torso. According to an aspect of the present invention, the suspension harness is attached to the support frame such that, when the suspension harness is operably secured to the rider's torso or legs and the connection means is mounted on the associated mounting structure (e.g., a ball structure) provided on the multi-wheeled vehicle, at least a portion of the support frame is positioned adjacent the rider's lower back, and at least one of a rider's legs and torso is suspended from the support frame by the suspension harness. With this arrangement, when in a "seated" position, the rider's weight is transferred from the suspension harness to the support frame, and from the support frame through the connection/mounting structure assembly to the vehicle. Therefore, by arranging the suspension harness to support the legs and/or torso of the rider, pressure is avoided in the rider's crotch area, thus eliminating the discomfort and potential health problems associated with traditional saddle-type bicycle seats.

In accordance with an embodiment of the present invention, the mounting structure comprises a ball mounted on a narrow neck, and the connection structure comprises a socket defining an opening for receiving the ball, and a channel for receiving the neck when the socket is rotated relative to the ball. When the rider mounts a multi-wheeled vehicle (e.g., a bicycle), the rider positions the socket opening over the ball/mounting structure, which is provided in the "seat" area of the vehicle (e.g., in the case of a bicycle, in the area typically used to support a traditional bicycle seat). The rider then causes the ball to enter the socket, and then leans forward to engage the neck located below the ball in the channel provided in the socket opening. With this arrangement, the rider is able to "lock" the support frame to the bicycle, thereby allowing the rider to press his/her lower back against the support frame while maintaining a substantially upright or forward leaning position, thus allowing the rider to exert a force greater than the rider's weight onto the pedals.

In accordance with an embodiment of the present invention, the rider support assembly comprises a backpack-like assembly including a semi-flexible spine that extends upward from the base section of the support frame, and the support harness is arranged to secure the rider's upper torso to an upper section of the spine. In one embodiment, the rider wears the backpack-like assembly substantially like a vest, with the harness secured around the rider's chest and/or shoulders, and the spine extending behind the rider and parallel to the rider's spine. When the rider mounts a multi-wheeled vehicle, couples the connecting structure to the mounting structure, and leans forward, the rider is comfortably suspended by the backpack-like support assembly over the vehicle frame without the need for supporting the rider's crotch region. In particular, the flexibility of the spine is selected such that when the rider leans forward, the spine flexes somewhat to conform with the rider's desired bent-over position, but also supports the rider's weight in the desired position in a manner that reduces strain on the rider's lower back, thus preventing the back discomfort and/or injury associated with conventional straddled seats. According to another aspect of the invention, by securing the spine to the bicycle by way of the mounting/connecting structures, and securing the rider to the spine by way of the harness, the backpack-like assembly allows the rider to press his lower back against the lower portion of the spine, thus allowing the rider to apply a force to the pedals of the bicycle that is not limited by the rider's weight.

In another embodiment, the mounting structure is secured by way of a pivot to the vehicle frame that the mounting structure can be rotated in a vertical plane, thereby facilitating fabrication of the spine from a relatively rigid material. In particular, by allowing the mounting structure to pivot, bending of the spine is not required in order to allow the rider to assume a desired forward-leaning position. By forming the spine from relatively stiff material, the spine is able to support a greater weight, and also facilitates a comfortable backrest when the rider assumed a "laid-back" position.

BRIEF DESCRIPTION OF THE DRAWINGS

These and other features, aspects and advantages of the present invention will become better understood with regard to the following description, appended claims, and accompanying drawings, where:

FIGS. 2(A), 2(B) and 2(C) are bottom views showing a ball-and-socket type connecting/mounting structure utilized to secure the backpack-like assembly to the bicycle of FIG. 1(A);

FIGS. FIGS. 3(A), 3(B) and 3(C) are cross-sectional side views showing the ball-and-socket type connecting/mounting structure of FIGS. 2(A)–2(C);

FIGS. 5(A) and 5(B) are rear and front views, respectively, showing a backpack-like support assembly according to another embodiment of the invention;

DETAILED DESCRIPTION OF THE DRAWINGS

Figure 1A:
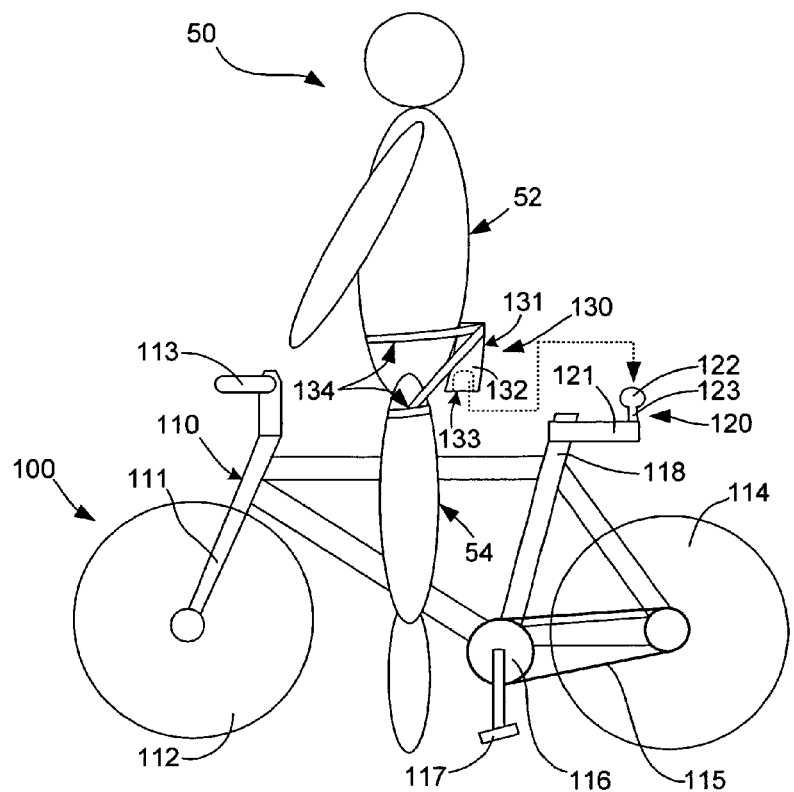
FIGS. 1(A) and 1(B) are simplified side views showing a bicycle and a rider wearing a rider support assembly according to an embodiment of the present invention.
Figure 1B:
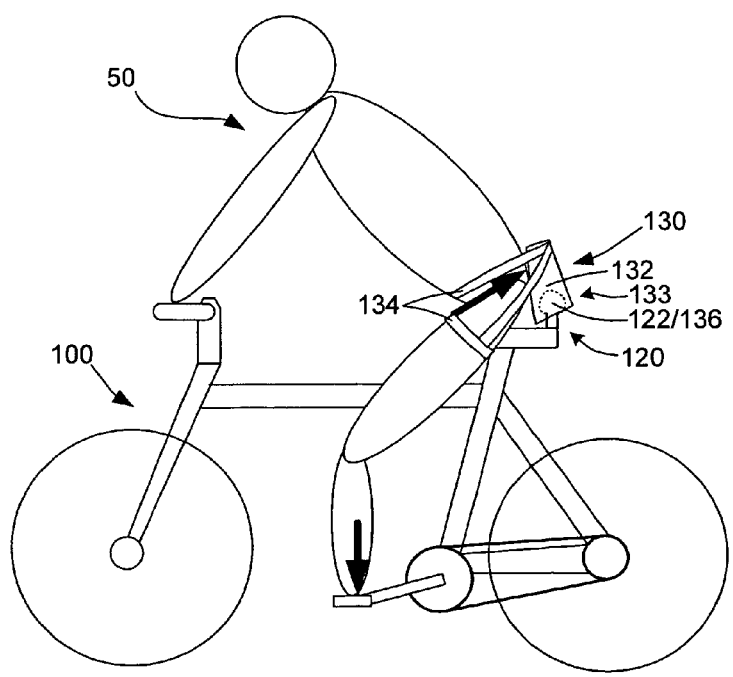

FIGS. 1(A) and 1(B) are simplified side views showing a rider 50 and a bicycle (multi-wheel vehicle) 100 according to a specific embodiment of the present invention. Bicycle 100 generally includes a bike (vehicle) frame 110, a mounting structure 120 that is fixedly attached to frame 110, and a rider support assembly 130 that is shown attached to rider 50.

Bike frame 110 is generally formed in accordance with known techniques, and includes several moving parts attached thereto. For example, front forks 111 are movably attached to a front end of frame 110, and a front wheel 112 is attached to forks 111. Handle bars 113 are operably connected to forks 111 to facilitate steering. A rear wheel 114 is mounted to a rear section of frame 110, and a drive train formed by a chain 115, a crank/gear 116, and a pedal 117 are operably connected to facilitate the transfer of power from rider 50 to rear wheel 114.

Mounting structure 120 is located on a seat post 118 of bike frame 110 that is typically utilized to support a traditional bike seat. In the current embodiment, mounting structure 120 includes a horizontal bar 121 extending horizontally from post 118, and a ball 122 mounted by way of a neck 123 to horizontal bar 121. In one embodiment, mounting structure 120 is formed separate from frame 110 and mounted to post 118 by way of a suitable fastening mechanism (not shown). In another embodiment, mounting structure 120 may be integrally formed on frame 110.

As indicated in FIGS. 1(A) and 1(B), support assembly 130 includes a support frame 131 (e.g., molded plastic) that includes a base section 132, a connection structure 133 located on a lower end of base section 132, and a suspension harness 134 attached to support frame 131. When operably secured to rider 50, base section 132 is positioned adjacent the lower back of (i.e., behind) rider 50, and suspension harness 134 extends from support frame 131 and is attached around at least one of torso 52 and legs 54 of rider 50. In the disclosed embodiment, at least one strap of support harness 134 is secured around the waist of rider 50, and at least one strap forms a loop (opening) that is looped around 54 of rider 50, and is secured at its upper end to support frame 131.

After putting on support assembly 130 in the manner shown in FIG. 1(A), rider 50 mounts bicycle 100 by adjusting the position of his/her torso 52 such that connection structure 133 is aligned with mounting structure 120, and then lowers connection structure 133 such that it couples with mounting structure 120. FIGS. 2(A) to 2(C) are bottom views showing connection structure 133 during various stages of coupling with mounting structure 120 in accordance with an exemplary embodiment, and FIGS. 3(A) to 3(C) are cross-sectional side views taken, for example, along section line 3–3 of FIG. 2(A). Referring to FIGS. 2(A), in accordance with an embodiment of the present invention, connection structure 133 includes a socket 136 that defines a substantially circular opening 137 for receiving ball 122 (see, e.g., FIG. 3(A)) of mounting structure 120. When the rider mounts the bicycle, the rider positions socket opening 137 over ball 122 (as indicated in FIG. 3(A)). The rider then causes ball 122 to enter socket 136 by "sitting" (moving base section 132 toward mounting structure 120, as indicated in FIGS. 3(A) and 3(B)). Once ball 122 is fully inserted into socket 136, socket 136 becomes pivotably supported by ball 122 such that base section 132 is rotatable in any direction (e.g., forward-and-backward pivoting, as indicated by double headed arrows, and also sided-to-side pivoting into and out of the plane of the drawing page). Accordingly, ball-and-socket arrangement provided by connection structure 133 and mounting structure 120 allow the rider to adjust his/her balance in a manner similar to that utilized on conventional saddle-type bicycle seats.

Referring again to FIG. 2(A), in accordance with another aspect of the present invention, socket 136 also defines a channel 210 for receiving neck 121 when socket 136 is rotated relative to ball 122. Referring to FIGS. 2(C) and 3(C), after ball 122 is fully received in socket 136 and the rider leans forward, base section 132 rotates relative to mounting structure 120 (i.e., in the direction of the curved arrow in FIG. 3(C)). This rotation causes neck 123 to enter channel 210, thereby "locking" support frame 131 to the bicycle and limiting the forward rotation of base section 132 (i.e., such the rider remains secured to the bicycle unless and until the rider leans back and stands up, thus reversing the locking process and disengaging socket 136 from ball 122). Note that, in the leaned-forward/locked position, base section 132 is prevented from disengaging from ball 122, so rider is reliably suspended by the support frame. Further, the rider is able to press his/her lower back against the support frame (as indicated in FIG. 1(B)) while maintaining a substantially upright or forward leaning position, thus allowing the rider to exert a force greater than the rider's weight onto the pedals. That is, because the rider is "locked" to the bicycle by way of connection socket 136 and ball 122, the rider is restrained from falling forward onto the bicycle frame, and is not necessarily pushed into a standing position when the rider exerts a force of the pedals that is equal to or greater than the rider's weight.

In accordance with an alternative embodiment, a second channel (not shown) may be provided opposite to channel 210 to facilitate a leaned-back, upright (i.e., "no hands")

rider orientation. The base section of the support frame may also include a hip support structure that comfortably supports the rider's lower back and hips in this leaned-back position.

According to another aspect of the present invention, support frame 131, connection structure 133 and suspension harness 134 and are arranged such that, when suspension harness 134 is operably secured to rider 50 and connection structure 133 is connected to mounting structure 120, at least one of torso 52 and legs 54 of rider 50 are suspended from support frame 131 by suspension harness 134. With this arrangement, when in the "seated" position depicted in FIG. 1(B), the rider's weight is transferred from suspension harness 134 to support frame 131, and from support frame 131 through connection structure 133 and mounting structure 120 to bicycle 100. Note that, by adjusting suspension harness 134 to support torso 52 and legs 54 of rider 50, pressure is avoided in the rider's crotch area, thus eliminating the discomfort and potential health problems associated with traditional saddle-type bicycle seats.

Several alternative embodiments of the present invention will now be described with reference to FIGS. 4(A) through 8(B). In describing these alternative embodiments, structures that are identical or similar to structures described above are denoted using the same or similar reference numbers.

Figure 4A:
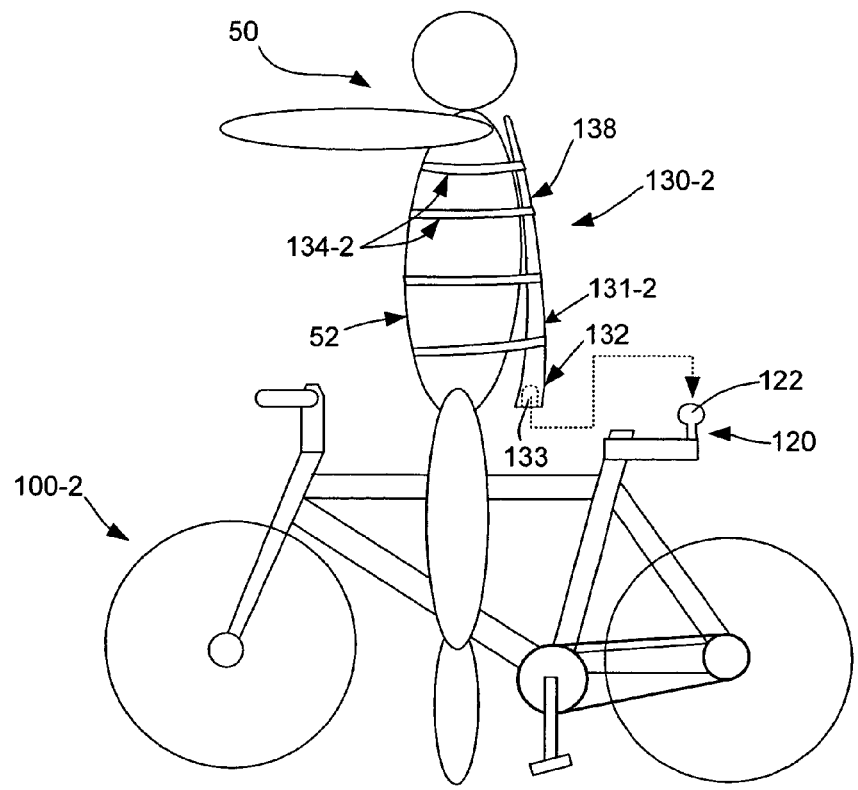
FIGS. 4(A) and 4(B) are simplified side views showing a bicycle and a rider wearing a backpack-type rider support assembly according to another embodiment of the present invention.
Figure 4B:
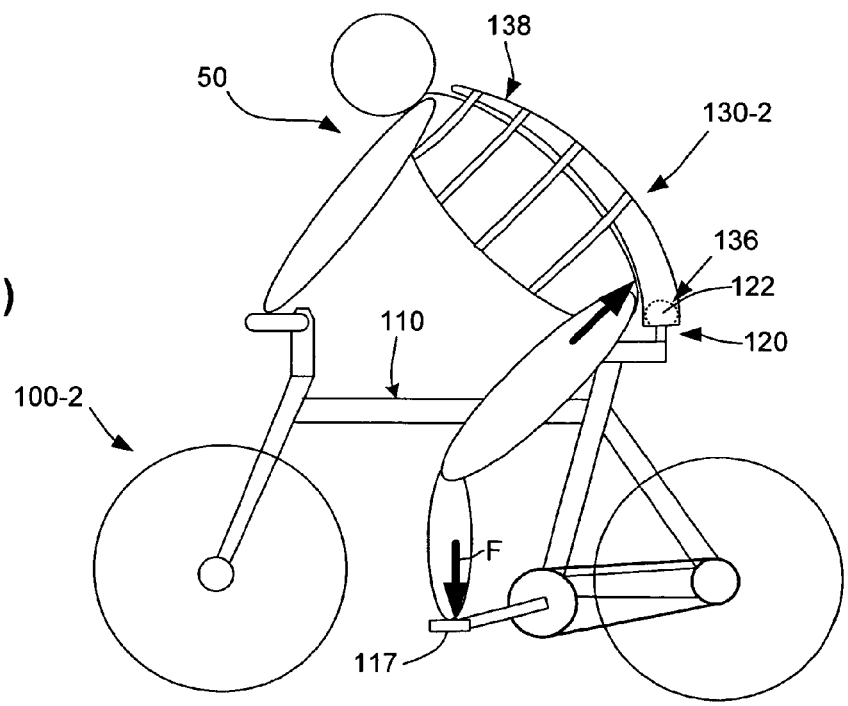

FIGS. 4(A) and 4(B) are simplified side views showing rider 50 and a bicycle 100-2 according to a specific embodiment of the present invention. Bicycle 100-2 is substantially identical to bicycle 100 (described above), but differs in that it includes a backpack-like rider support assembly 130-2 including a semi-flexible spine 138 that extends upward from a base section 132-2 of a support frame 131-2, and support harness 134-2 is arranged to secure the upper torso 52 of rider 50 to an upper section of spine 138. In one embodiment, rider 50 wears backpack-like support assembly 130-2 substantially like a vest, with support harness 134 secured around the rider's chest and/or shoulders, and spine 138 extends behind rider 50 and parallel to the rider's spine. When rider 50 mounts bicycle 100-2, couples connecting structure 133 to mounting structure 120 in a manner similar to that described above, and leans forward as indicated in FIG. 4(B), the upper torso region of rider 50 is comfortably suspended by backpack-like support assembly 130-2 over bicycle frame 110. In particular, the flexibility of spine 138 is selected such that when rider 50 leans forward into an aerodynamic position, spine 138 flexes (bends) to conform with the rider's desired bent-over position, but also supports the rider's weight in the desired position in a manner that reduces strain on the rider's lower back, thus preventing the back discomfort and/or injury associated with conventional straddled seats. According to another aspect of the invention, by securing spine 138 to bicycle 100-2 by way of base section 132, connection structure 133 and mounting structure 120, and securing rider 50 to spine 138 by way of support harness 134-2, backpack-like support assembly 130-2 allows rider 50 to press his/her lower back against the lower portion of spine 138 (as indicated by arrow in FIG. 4(B), thus allowing the rider to apply a force F to the pedals of the bicycle that is greater than the rider's weight.

FIGS. 5(A) and 5(B) are rear and front views, respectively, showing rider 50 wearing a backpack-like support assembly 130-3 according to another embodiment of the invention. Support assembly 130-3 includes a Y-shaped spine 138-3 including a first portion 139A located on a first shoulder of rider 50, and a second portion 139B located on a second shoulder of rider 50, and a support harness 134-3 including several straps 134-3A through 134-3D that are connected between Y-shaped upper spine 138-3 and a buckle 510 located over the rider's chest (as shown in FIG. 5(B)) for securing support assembly 130-3 to the rider's upper torso. In operation, backpack-like support assembly 130-3 functions essentially as described above with reference to FIGS. 4(A) and 4(B).

Figure 6A:
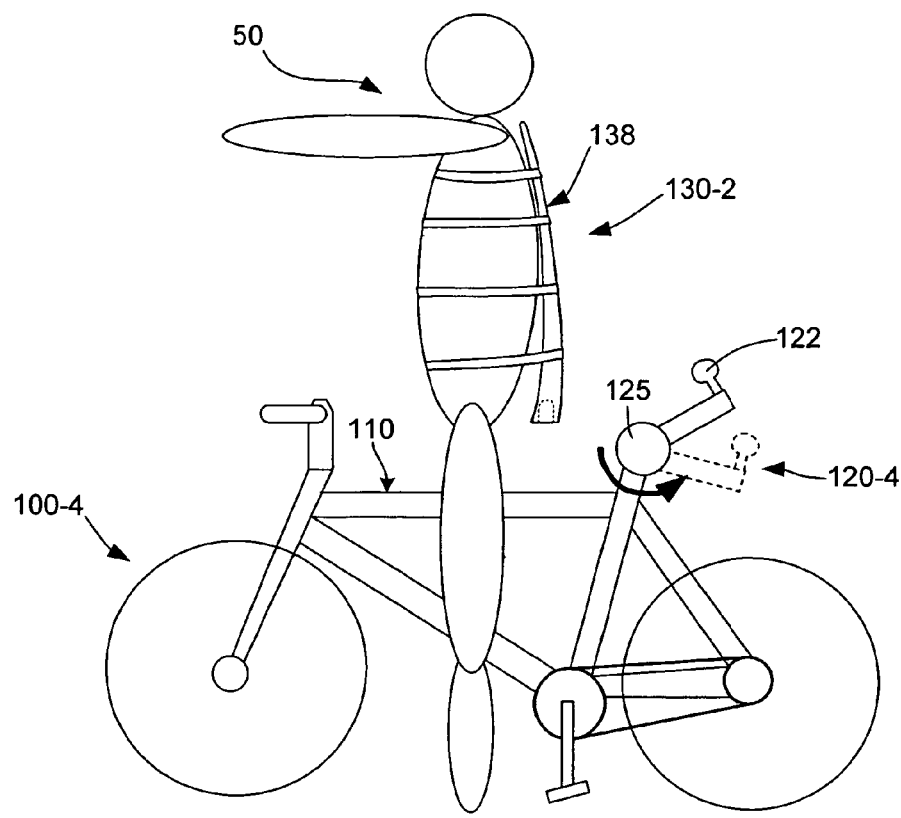
FIGS. 6(A) and 6(B) are simplified side views showing a bicycle and a rider wearing a backpack-like assembly according to another embodiment of the invention.
Figure 6B:
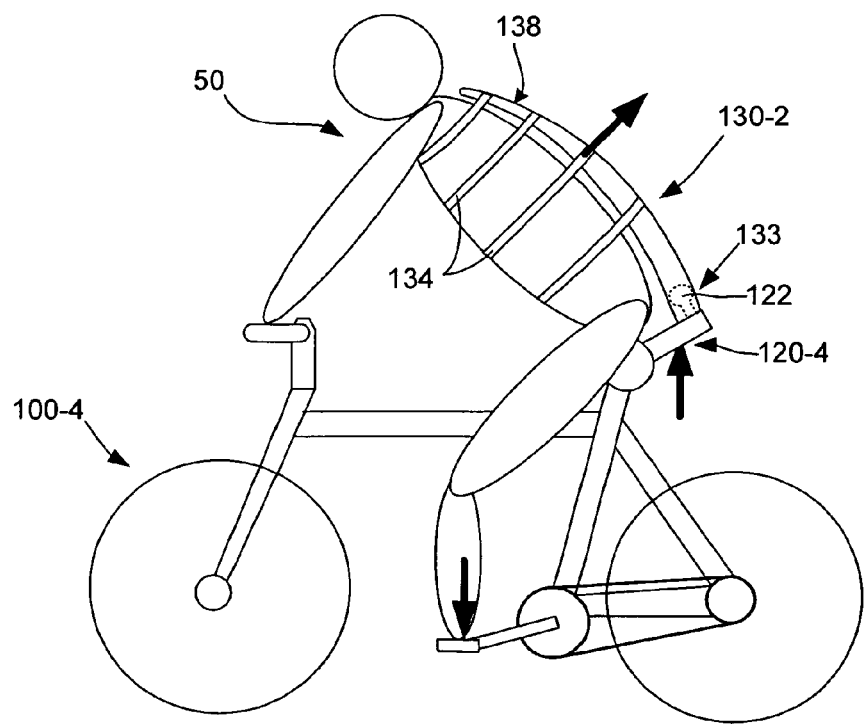

FIGS. 6(A) and 6(B) are simplified side views showing a bicycle 100-4 and rider 50 wearing a backpack-like support assembly 130-4 according to another embodiment of the invention. In this embodiment, backpack-like support assembly 130-4 is substantially identical to the backpack-like support assemblies described above, but bicycle 100-4 differs from the bicycle assemblies described above in that it includes a mounting structure 120-4 that is secured by way of a spring-biased hinge or pivot 125 to bicycle frame 110 in a way that biases mounting structure 120-4 in a vertical plane in the direction indicated by the curved arrow in FIG. 6(A) (i.e., such that ball 122 is rotated toward the front end of bicycle frame 110). Rider 50 mounts bicycle 100-4 in a manner similar to that described above, and causes mounting structure 120-4 to rotate downward by "sitting" in support assembly 130-4. When riding in the forward-leaning position, as indicated in FIG. 6(B), mounting structure 120-4 is biased to rotate forward, thereby increasing the leg stroke length of rider 50 by raising the rider's torso. This arrangement also facilitates the fabrication of spine 138 from a relatively rigid material. In particular, by facilitating the pivoting of mounting structure 120-4 as indicated, the requirement that spine 138 bend in response to the forward lean of rider 50 is greatly reduced. By forming spine 138 from relatively stiff material, spine 138 is able to support a greater weight in the forward-leaning position, and is also able to facilitate a comfortable backrest when the rider assumes an upright position.

Figure 7:
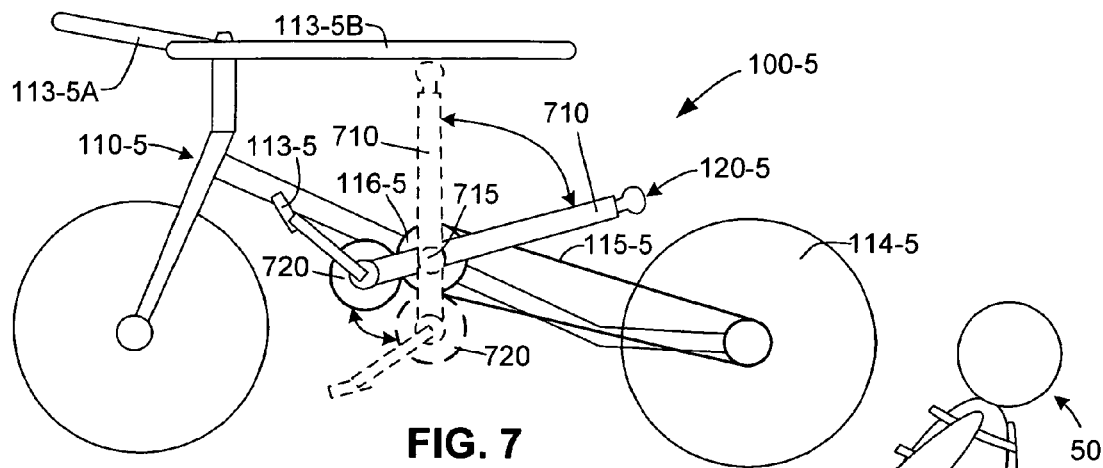
FIG. 7 is a simplified side view showing a bicycle according to another embodiment of the present invention.

FIGS. 7 is a simplified side view showing a bicycle 100-5 according to another embodiment of the present invention. Bicycle 100-5 includes a frame 110-5, a pivoting support bar 710 that is attached by a hinge 715 to frame 110-5, a mounting structure 120-5 attached to a first end of support bar 710, and a planetary drive gear 720 rotatably connected to a second end of support bar 710. In addition, bicycle 100-5 includes first "normal" handlebars 113-5A and second "elongated" handlebars 113-5B that extend from first handlebars 113-5A toward a back of bicycle 100-5. As indicated by the curved arrow and solid/dashed lines in FIG. 7, support bar 710 pivots between a lower position and a raised position. Note that planetary drive gear 720 remains operably connected to drive gear 116-5 (e.g., by way of an idle gear, not shown) such that force applied to pedals 113-5 is transmitted to rear wheel 114-5 by way of drive gear 116-5 and chain 115-5 when support bar 710 is in either position.

Figure 8A:
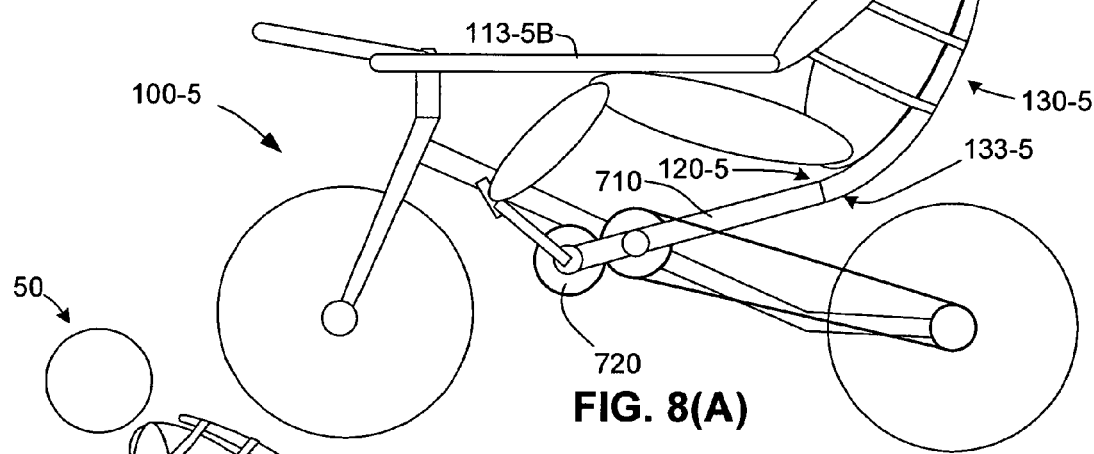
FIGS. 8(A) and 8(B) are simplified side views showing a rider wearing a backpack-like assembly and operating the bicycle of FIG. 7 in reclined and forward-leaning positions, respectively.
Figure 8B:
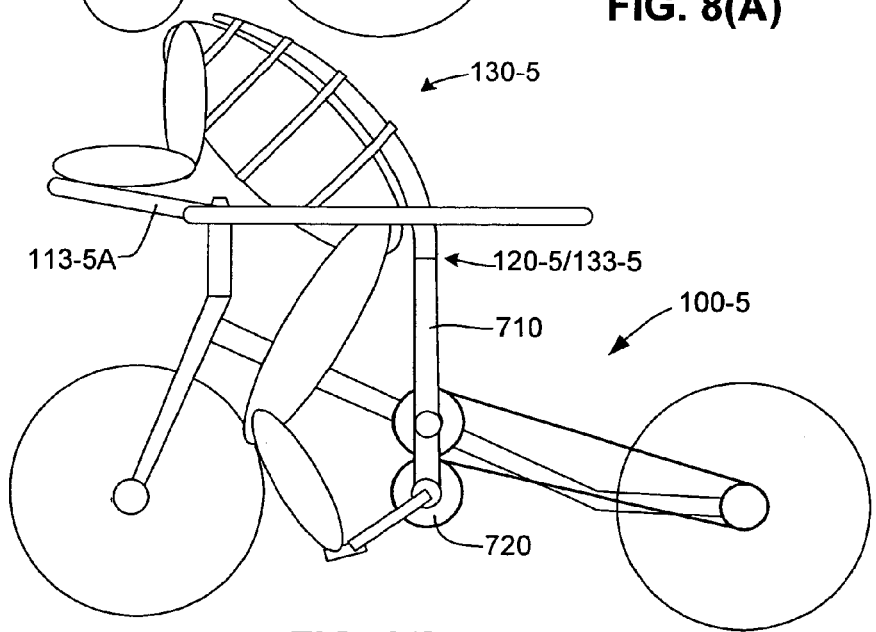

FIGS. 8(A) and 8(B) depict rider 50 operating bicycle 100-5. Similar to the embodiments described above, rider 50 is wearing a backpack-like support assembly 130-5 that is connected to mounting structure 120-5 by way of a connecting structure 133-5. FIG. 8(A) shows rider 50 in a reclined "energy saving" position in which planetary gear 720 is rotated forward and support assembly 130-5 forms a seat-like support that allows rider 50 to pedal in a position that would be recognized by those familiar with human-powered vehicles. Note that, in the reclined position, rider 50 controls bicycle 100-5 by way of handlebars 113-5B. FIG. 8(B) shows rider 50 in an upright "power" position in which planetary gear 720 is rotated back and support assembly 130-5 forms the suspension-type support described above that allows rider 50 to utilize more of his/her body weight. Note that in the upright position rider 50 controls bicycle 100-5 by way of handlebars 113-5A. As indicated in these figures, the use of backpack-type support assembly 130-5 facilitates the formation of bicycle 100-5 such that rider 50 can shift between the reclined "energy saving" position shown in FIG. 8(A) and the upright "power" position shown in FIG. 8(B).

Although the invention has been described in conjunction with bicycles that omit traditional seats, in accordance with a possible alternative embodiment, the support assemblies described above may be utilized in conjunction with a conventional saddle-type vehicle seats.

In accordance with another aspect of the present invention, the spine utilized in the backpack-type support assembly described above may include a telescoping (elongating) mechanism that allows a rider to selectively increase his/her leg stroke length.

While connection structure 133 and mounting structure 120 are illustrated in the disclosed examples using a ball-and-socket arrangement, those skilled in the art will recognize that this arrangement may be replaced with a mechanism that performs a similar function. Accordingly, the coupling process illustrated in the figures is not intended to limit the appended claims unless specifically referenced.

In addition, although support harnesses utilized in the present invention are depicted as including several straps, a suitable support harness may also be produced using a sling-like structure formed, for example from a suitable material (e.g., cotton, nylon or spandex) that may be reinforced with one or more additional materials. In another embodiment, the support harness and support frame may be integrated into a riding garment (e.g., similar to biking pants) with the connection structure exposed on a rear side of the garment. Accordingly, the support harnesses illustrated in the various figures are not intended to limit the appended claims unless specifically called out.

Although the invention has been described with specific reference to two-wheeled bicycles, the present invention may also be utilized in other multi-wheeled vehicles that utilize straddled seats, such as motorcycles, three- and four-wheeled all-terrain vehicles, and human-powered vehicle assemblies.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A rider support assembly for a vehicle, the vehicle including a mounting structure, the rider support assembly comprising:
   a support frame including a base section;
   a connection structure located on the base section of the support frame; and
   a suspension harness attached to the support frame such that, when the suspension harness is operably secured to a rider and the connection structure is connected to the mounting structure of the vehicle, at least a portion of the support frame is positioned adjacent the rider's lower back, and at least one of a rider's legs and torso is suspended from the support frame by the suspension harness,
   wherein the mounting structure comprises one of a ball and a socket fixedly connected to the vehicle, and the connection structure comprises the other of the ball and the socket,
   wherein the socket defines an opening for receiving the ball such that the base section is rotatably supported on the mounting structure when the ball is received inside the socket, and
   wherein the assembly includes means for selectively securing the ball inside the socket such that the support frame is selectively locked to the vehicle.

2. The rider support assembly according to claim 1, wherein the suspension harness comprises at least one of a strap and sling attached to the base section of the support frame and defining leg holes for relieving the rider's legs.

3. The rider support assembly according to claim 1, wherein the ball is mounted on a relatively narrow neck, and wherein the opening defined by the socket includes a channel for receiving the neck when the socket is rotated relative to the ball.

4. A rider support assembly for a vehicle, the vehicle including a mounting structure, the rider support assembly comprising:
   a support frame including a base section;
   a connection structure located on the base section of the support frame; and
   a suspension harness attached to the support frame such that, when the suspension harness is operably secured to a rider and the connection structure is connected to the mounting structure of the vehicle, at least a portion of the support frame is positioned adjacent the rider's lower back, and at least one of a rider's legs and torso is suspended from the support frame by the suspension harness;
   a spine extending upward from the base section; and
   means for attaching the spine to the rider's torso,
   wherein a flexibility of the spine is selected such that when the rider assumes a bent position, the spine flexes to conform to the rider's torso, and also supports at least a portion of the rider's weight in the bent position.

5. The rider support assembly according to claim 4, wherein the support harness comprises at least one of a strap and a sling for securing around the rider's chest.

6. The rider support assembly according to claim 4, wherein the spine comprises a Y-shaped upper spine selection and the support harness comprises means connected to the Y-shaped upper spine section for securing the rider's upper torso.

7. A vehicle comprising:
   a vehicle frame; a mounting structure attached to the vehicle frame; and
   a rider support assembly including:
      a support frame including a base section,
      a connection structure located on the base section of the support frame, and
      a suspension harness attached to the support frame such that, when the suspension harness is operably secured to a rider and the connection structure is connected to the mounting structure of the vehicle, at least a portion of the support frame is positioned adjacent the rider's lower back, and at least one of a rider's legs and torso is suspended from the support frame by the suspension harness,
      wherein the mounting structure comprises one of a ball and a socket fixedly connected to the vehicle, and the connection structure comprises the other of the ball and the socket,
   wherein the socket defines an opening for receiving the ball such that the base section is rotatably supported on the mounting structure when the ball is received inside the socket, and such that the ball is selectively securable inside the socket such that the support frame is selectively locked to the vehicle, and wherein the support frame further comprises a spine extending upward from the base selection.

8. The vehicle according to claim 7 wherein the suspension harness comprises at least one of a strap and a sling attached to the base section of the support frame and defining leg holes for receiving the rider's legs.

9. The vehicle according to claim 7, wherein the ball is mounted on a relatively narrow neck, and wherein the opening defined by the socket includes a channel for receiving the neck when the socket is rotated relative to the ball.

10. The vehicle according to claim 7, wherein the support harness includes means for attaching the spine to the rider's torso.

11. The vehicle according to claim 10 wherein the support harness comprises at least one of a strap and a sling for securing around the rider's chest such that the spine is pressed against the rider's back.

12. The vehicle according to claim 7, wherein the spine comprises a Y-shaped upper spine section, and the support harness comprises means connected to the Y-shaped upper spine section for securing the rider's upper torso.

13. The vehicle according to claim 7, wherein the mounting structure comprises a first portion fixedly connected to the vehicle frame, and a second portion pivotably mounted to the first portion and resiliently biased to rotate toward a front end of the vehicle frame.

14. The vehicle according to claim 7, wherein the mounting structure is secured to an elongated post structure that is pivotably connected to the vehicle frame such that the elongated post structure is rotatable in a plane that is parallel to a plane defined by the vehicle frame.

15. The vehicle according to claim 7, wherein the vehicle comprises one of a bicycle, a motorcycle, and an all terrain vehicle.

* * * * *